United States Patent
Duda et al.

(10) Patent No.: US 9,749,231 B2
(45) Date of Patent: Aug. 29, 2017

(54) METHOD AND SYSTEM FOR OVERLAY ROUTING WITH VXLAN ON BARE METAL SERVERS

(71) Applicants: Kenneth James Duda, Santa Clara, CA (US); Adam James Sweeney, Santa Clara, CA (US)

(72) Inventors: Kenneth James Duda, Santa Clara, CA (US); Adam James Sweeney, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 25 days.

(21) Appl. No.: 14/321,381

(22) Filed: Jul. 1, 2014

(65) Prior Publication Data

US 2015/0010002 A1    Jan. 8, 2015

Related U.S. Application Data

(60) Provisional application No. 61/846,259, filed on Jul. 15, 2013, provisional application No. 61/842,132, filed on Jul. 2, 2013.

(51) Int. Cl.
| | | |
|---|---|---|
| *H04L 12/715* | (2013.01) | |
| *H04L 12/741* | (2013.01) | |
| *H04L 12/721* | (2013.01) | |
| *H04L 12/931* | (2013.01) | |
| *H04L 12/46* | (2006.01) | |
| *H04L 12/713* | (2013.01) | |
| *H04L 29/06* | (2006.01) | |

(52) U.S. Cl.
CPC .......... *H04L 45/64* (2013.01); *H04L 12/4633* (2013.01); *H04L 12/4641* (2013.01); *H04L 45/586* (2013.01); *H04L 45/66* (2013.01); *H04L 45/74* (2013.01); *H04L 45/745* (2013.01); *H04L 49/70* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 2004/0162914 A1* | 8/2004 | St. Pierre | .......... | H04L 29/12009 709/245 |
| 2015/0244617 A1* | 8/2015 | Nakil | .................. | G06F 9/45558 709/224 |

* cited by examiner

*Primary Examiner* — Adnan Baig
(74) *Attorney, Agent, or Firm* — Chamberlain Hrdlicka

(57) ABSTRACT

In general, embodiments of the invention relate to routing packets between servers in different layer 2 domains. More specifically, embodiments of the invention relate to using overlay routing mechanisms in an Internet Protocol (IP) fabric to enable communication between servers in different layer 2 domains to communication. The overlay routing mechanisms may include direct routing, indirect routing, naked routing, or a combination thereof (e.g., hybrid routing).

15 Claims, 11 Drawing Sheets

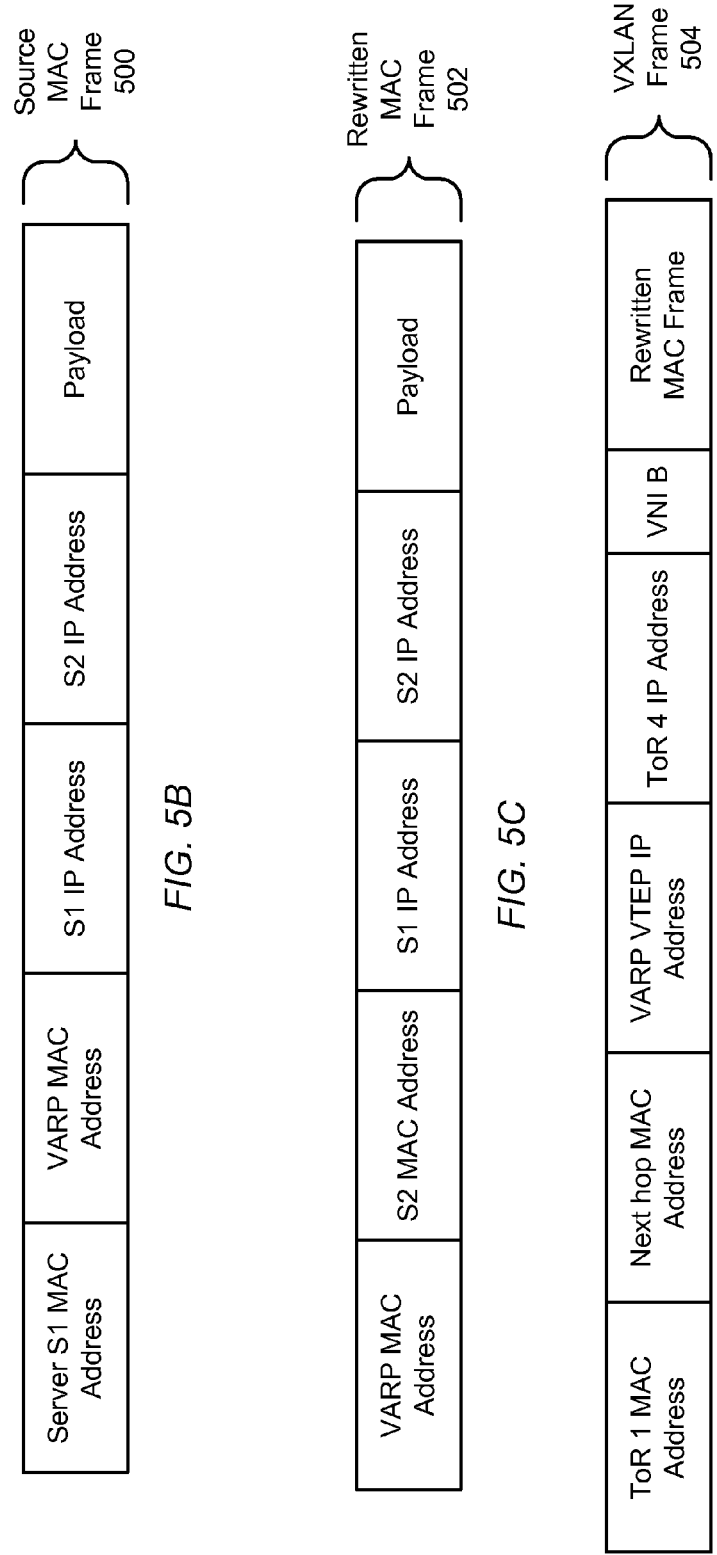

METHOD AND SYSTEM FOR OVERLAY ROUTING WITH VXLAN ON BARE METAL SERVERS

CROSS-REFERENCE TO RELATED APPLICATIONS

Pursuant to 35 U.S.C. §119(e), this application claims benefit of U.S. Provisional Application No. 61/842,132 filed on Jul. 2, 2013, entitled "METHOD AND SYSTEM FOR OVERLAY ROUTING WITH VXLAN." The disclosure of the U.S. Provisional Application is incorporated herein by reference in its entirety.

Pursuant to 35 U.S.C. §119(e), this application claims benefit of U.S. Provisional Application No. 61/846,259 filed on Jul. 15, 2013, entitled "METHOD AND SYSTEM FOR TOP OF RACK SWITCH ROUTING WITH VXLAN AND NSX." The disclosure of the U.S. Provisional Application is incorporated herein by reference in its entirety.

BACKGROUND

Data centers typically include multiple hosts. The hosts may belong to virtual layer 2 segments that span across a physical layer-3 data center network using an overlay technology. Traditionally, when using an overlay technology, hosts in different layer 2 segments are unable to communicate.

SUMMARY

In general, in one aspect, the invention relates to a method for routing. The method includes processing, on the first ToR switch, a MAC frame to obtain a rewritten MAC frame, wherein the MAC frame comprises a VARP MAC address, a first server IP address associated with a first server, and a second server IP address associated with a second server, wherein the rewritten MAC frame comprises a second server MAC address associated with the second server and the VARP MAC address, generating, by the first ToR switch, a first VXLAN frame comprising the first ToR Switch MAC address, a next hop MAC address, a second ToR switch IP address, the second server IP address, a VNI, and the rewritten MAC frame, and routing the second VXLAN frame through an IP fabric to a second ToR switch, wherein the IP Fabric comprises a spine tier comprising a spine switch and a leaf tier comprising the first ToR switch, and the second ToR switch and wherein the second server is connected to the second ToR switch.

In general, in one aspect, the invention relates to a method for routing. The method includes generating, by the first ToR switch, a first VXLAN frame comprising the first ToR switch MAC address, a first next hop MAC address, a first ToR IP address, a second ToR switch IP address, a first VNI, and a MAC frame, wherein the MAC frame comprises a second ToR MAC address, a first server IP address associated with a first server, and a second server IP address associated with a second server, routing the first VXLAN frame through an IP fabric to the second ToR switch, wherein the IP Fabric comprises a spine switch, the first ToR switch, and the second ToR switch, receiving, by the second ToR switch, the first VXLAN frame, decapsulating, by the second ToR switch, the first VXLAN frame to obtain the MAC frame, processing, on the second ToR switch, the MAC frame to obtain a rewritten MAC frame, wherein the rewritten MAC frame comprises a VARPMAC address and a second server MAC address, generating, by the second ToR switch, a second VXLAN frame comprising a second ToR switch MAC address, a second next hop MAC address, a VARP VTEP IP address, a third ToR switch IP address, a second VNI, and the rewritten MAC frame, wherein the third ToR switch IP address is associated with the third ToR switch, and routing the second VXLAN frame through the IP fabric to the third ToR switch.

In general, in one aspect, the invention relates to a method for routing. The method includes generating, by the first ToR switch, a first VXLAN frame comprising the first ToR switch MAC address, a first next hop MAC address, a VARP VTEP IP address, a second ToR switch IP address, a first VNI, and a MAC frame, wherein the MAC frame comprises a first VARP MAC address, a first server IP address associated with a first server, a second server IP address associated with a second server, and a payload, routing the first VXLAN frame through an IP fabric to the second ToR switch, wherein the IP Fabric comprises a spine tier, the first ToR switch, and the second ToR switch, receiving the first VXLAN frame by the second ToR switch, decapsulating the first VXLAN frame to obtain the MAC frame, routing, not using a VXLAN protocol, the MAC frame to the third ToR switch via the spine tier, receiving, by a third ToR switch from the spine tier, a second MAC frame comprising the payload, processing, on the third ToR switch, the second MAC frame to obtain a third MAC frame, wherein the third MAC frame comprises a second server MAC address and a second VARP MAC address, generating, by the third ToR switch, a second VXLAN frame comprising the second MAC address, a second next hop MAC address, a second VARP VTEP IP address, a fourth ToR switch IP address, a second VNI, and the third MAC frame, wherein the fourth ToR Switch IP address is associated with a fourth ToR switch, and routing the second VXLAN frame through a IP fabric towards the fourth ToR switch, wherein the IP fabric further comprises the third ToR switch and the fourth ToR switch.

Other aspects of the invention will be apparent from the following description and the appended claims.

BRIEF DESCRIPTION OF DRAWINGS

FIG. 5B shows an exemplary MAC frame in accordance with one or more embodiments of the invention.

FIG. 5C shows an exemplary MAC frame in accordance with one or more embodiments of the invention.

FIG. 5D shows an exemplary VXLAN frame in accordance with one or more embodiments of the invention.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-9, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to routing packets between hosts (also referred to as bare metal severs) in different layer 2 domains. More specifically, embodiments of the invention relate to using overlay routing mechanisms in an Internet Protocol (IP) fabric to enable communication between hosts in different layer 2 domains. The overlay routing mechanisms may include direct routing (see e.g., FIGS. 4 and 5A-5D), indirect routing (see e.g., FIGS. 6 and 7), naked routing (see e.g., FIGS. 8 and 9), or a combination thereof (e.g., hybrid routing).

In one embodiment of the invention, the overlay routing mechanisms use, at least in part, the VXLAN protocol. One version of the VXLAN protocol is defined in the document entitled "VXLAN: A Framework for Overlaying Virtualized Layer 2 Networks over Layer 3 Networks" version 09 dated April 2014. The VXLAN protocol is hereby incorporated by reference in its entirety. The invention is not limited to a particular version of VXLAN.

Figure 2:
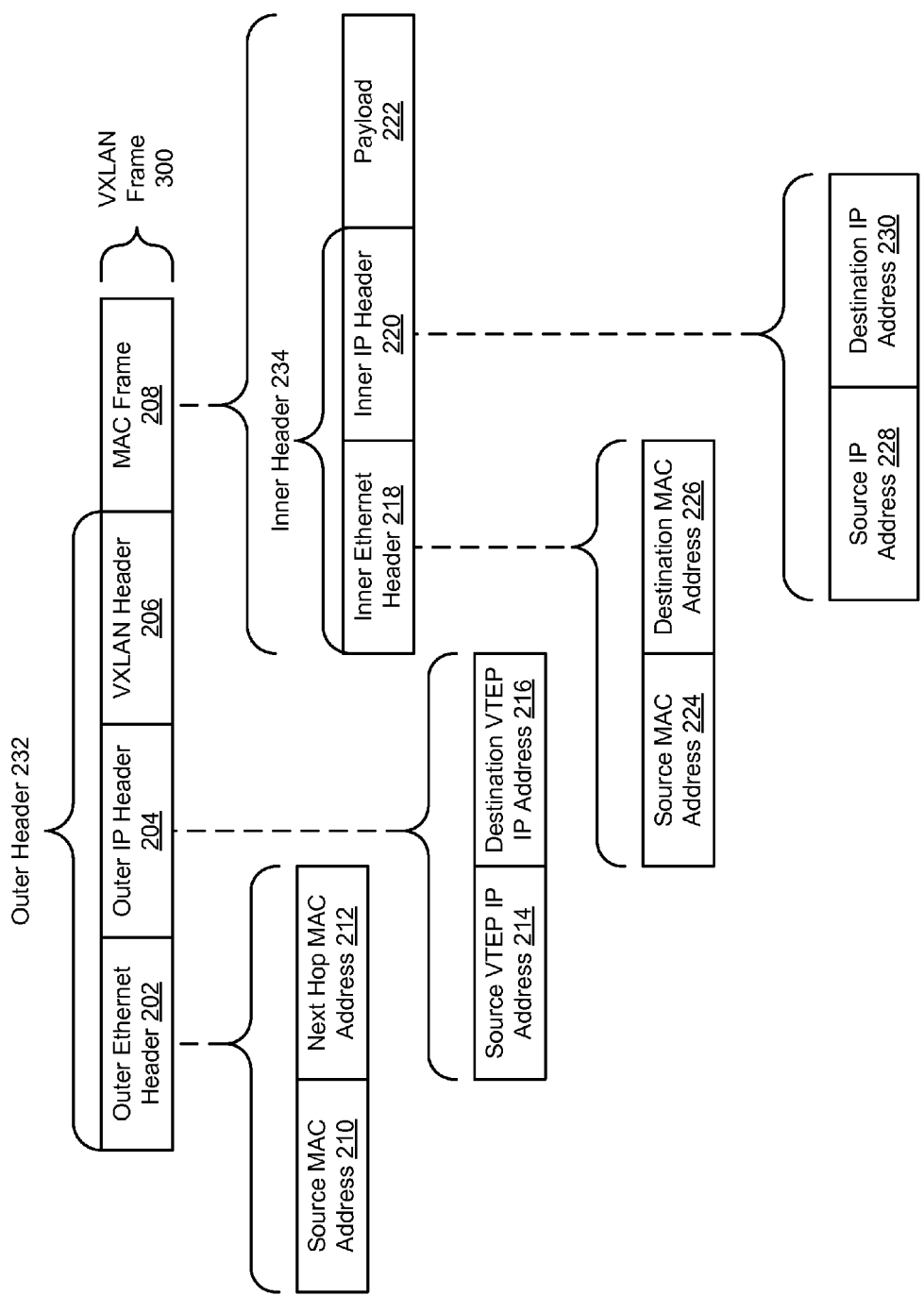
FIG. 2 shows a VXLAN frame in accordance with one or more embodiments of the invention.

In one embodiment of the invention, a layer 2 domain is defined as the set of hosts (also referred to as servers) that communicate using the same virtual network identifier (VNI), where the VNI is defined by the VXLAN protocol (see e.g., FIG. 2). The VNI scopes the MAC frame originated by the host such that the MAC frame may only be received by destinations (e.g., hosts or virtual machines) associated with the same VNI.

In the following description, all references to specific MAC addresses, e.g., ToR switch MAC, refer to a MAC address associated with a specific component in the system, e.g., a server, a ToR Switch, a Spine switch, etc., but should not be interpreted to mean that such component only has one such MAC address. Rather, in various embodiments of the invention, one or more of the aforementioned components may be associated with multiple MAC addresses.

In the following description, all references to specific IP addresses, e.g., SS IP address, refer to a MAC address associated with a specific component in the system, e.g., a server, a ToR Switch, a Spine switch, etc., but should not be interpreted to mean that such component only has one such IP address. Rather, in various embodiments of the invention, one or more of the aforementioned components may be associated with multiple IP addresses.

Figure 1:
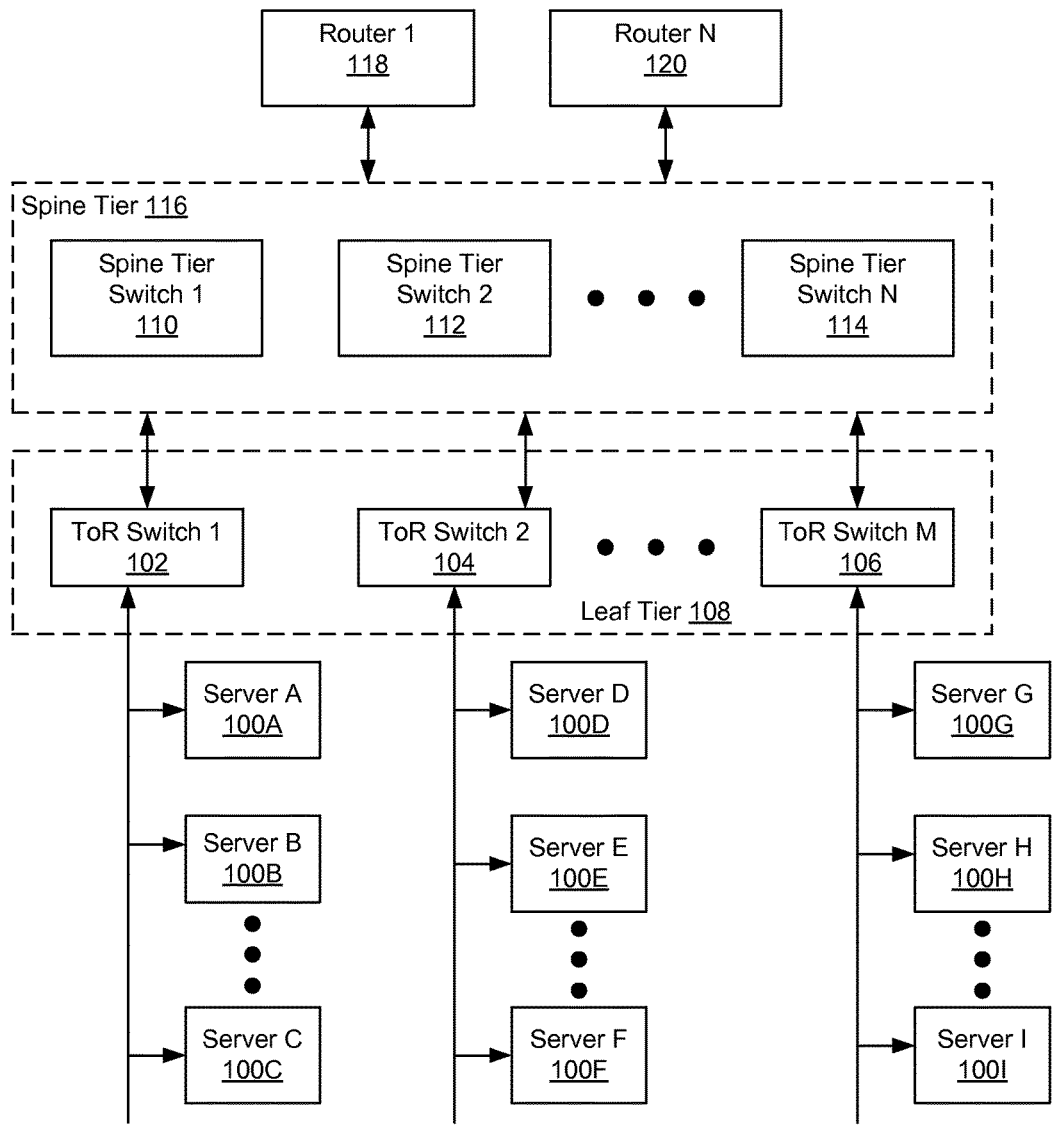
FIG. 1 shows a system in accordance with one or more embodiments of the invention.

FIG. 1 shows a system in accordance with one or more embodiments of the invention. The system includes one or more servers (100A-100I), a leaf tier (108), a spine tier (116), and one or more routers (118, 120). The leaf tier and the spine tier may be collectively referred to as the IP Fabric. Further, all of the aforementioned components may be co-located in the same physical location. Alternatively, the aforementioned components may not all be co-located. Additional details regarding each of the aforementioned components are provided below.

In one embodiment of the invention, a server (also referred to as a host) (100A-100I) is a computer system. A computer system may include any type of physical system that is configured to generate, send, receive, and/or process MAC frames (see e.g., FIG. 4A-9). The computer system may include a processor, memory, and one or more physical network interfaces.

Each server is directly connected to at least one Top of Rack (ToR) switch (102, 104, 106) in the leaf tier (108). In one embodiment of the invention, each server is only directly connected to a single ToR switch in the leaf tier (108). In one embodiment of the invention, the ToR switches in leaf tier (108) are not directly connected to each other. Alternatively, if the ToR switches implement Multichassis Link Aggregation (MLAG), then a given ToR switch may be directly connected to one other ToR switch in the leaf tier and a given server may be connected to each of the ToR switches in the MLAG domain. Each of the ToR switches may include or be configured to execute one or more virtual tunnel end points (VTEP) VTEPs (see FIG. 3).

Each ToR switch in the leaf tier (108) is connected to at least one spine switch (110, 112, 114) in the spine tier (116). In one embodiment of the invention, each ToR switch is connected to every other switch in the spine tier. Further, in one embodiment of the invention, the spine switches in the spine tier (116) are not directly connected to each other. Alternatively, if the spine switches implement Multichassis Link Aggregation (MLAG), then a given spine switch may be directly connected to one other spine switch in the spine tier.

In one embodiment of the invention, each leaf switch and each spine switch is a physical device that includes persistent storage, memory (e.g., Random Access Memory), one or more processors, and two or more physical ports. Each port may be connected to either: (i) a computer system (described above), or (ii) a network device (i.e., any device that is part of the network infrastructure such as a leaf switch, a spine switch or a router). Each switch (leaf switch and spine switch) is configured to receive VXLAN frames and/or MAC frames via the ports and determine whether to process the VXLAN and/or MAC frames in accordance with the methods described below in FIGS. 4, 6, and 8.

Figure 3:
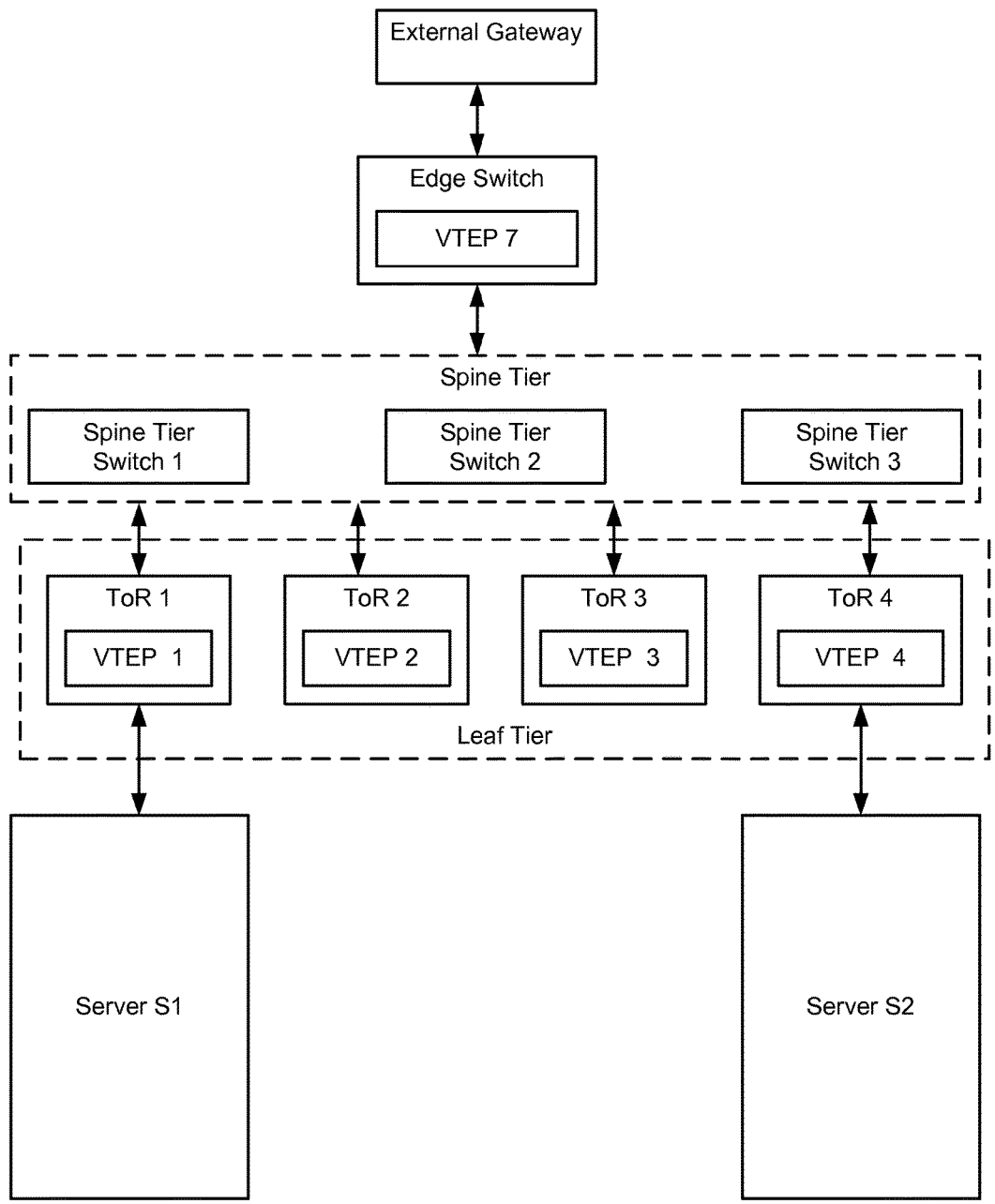
FIG. 3 shows an exemplary system in accordance with one or more embodiments of the invention.

Continuing discussion of FIG. 1, the spine switches may be directly connected to one or more routers (118, 120) or may be indirectly connected to one or more routers (see FIG. 3). In the latter scenario, the spine switches may be connected to one or more edge switches (not shown in FIG. 1) that, in turn, are directly connected to one or more routers (118, 120).

In one embodiment of the invention, the routers (118, 120) are configured to receive MAC frames from other networks (e.g., the Internet) and route the MAC frames towards the appropriate server (100A-100I). In one embodiment of the invention, each router includes a number of physical ports (hereafter ports) and is configured to receive MAC frames via the ports and determine whether to (i) drop the MAC frame, or (ii) send the MAC frame out over another one of the ports on the switch. The router uses the destination internet protocol (IP) address in the received MAC frame along with a routing table to determine out of which port to send the MAC frame.

FIG. 2 shows a VXLAN frame in accordance with one or more embodiments of the invention. The VXLAN frame (200) includes: (i) a MAC frame (208), (ii) a VXLAN header (206), (iii) an outer IP header (204), and (iv) an outer Ethernet header (202). Each of the aforementioned components is described below.

In one embodiment of the invention, the MAC frame (210) is generated by a source host and may include an inner header (234) and a payload (222). The payload (222) may include the content that the source host is attempting to transmit to the destination host. The inner header (234) includes an inner Ethernet header (218) and an inner IP header (220). The inner Ethernet header (218) includes a source MAC address (224) and a destination MAC address (226). The inner IP header (220) includes a source IP address (228) and a destination IP address (230). The MAC frame may include other information/content without departing from the invention.

In one embodiment of the invention, the VXLAN header (206) may include, but is not limited to, a virtual network identifier (VNI). The VNI scopes the MAC frame (208) originated by the host such that the MAC frame (208) may only be received by destination servers associated (via a VTEP) with the same VNI. The VXLAN header may include other information/content without departing from the invention.

In one embodiment of the invention, the outer Ethernet header (202) and the outer IP header (204) are used to route the VXLAN frame from the source VTEP to the destination VTEP. To this end, the outer Ethernet header (302) includes the source MAC address (210) and the next hop MAC address (212) and the outer IP header (204) includes the source VTEP IP address (214) and the destination VTEP IP address (216). The aforementioned mentioned components may include other information/content without departing from the invention. The outer Ethernet header (202), the outer IP header (204), and the VXLAN header (306) may be collectively referred to as an outer header (232).

The VXLAN frame may include other components without departing from the invention.

FIG. 3 shows an exemplary system in accordance with one or more embodiments of the invention. The invention is not limited to the system shown in FIG. 3. Turning to FIG. 3, the system includes two servers (Server S1 and Server S2).

In one embodiment of the invention, each server is associated with at least one Internet Protocol (IP) address and one media access control (MAC) address. In the example shown in FIG. 3, each server is associated with at least one VXLAN. Specifically, server S1 is associated with VXLAN A and server S2 is associated with VXLAN B.

Continuing with the discussion of FIG. 3, server S1 is directly connected to ToR 1 and server S2 is directly connected to ToR 4. In this example, each server is only connected to a single ToR switch. Each ToR switch (ToR 1-ToR 4) includes a VTEP (VTEP 1-4). Each of the ToR switches is directly connected to every other spine switch (Spine Switch 1-3) in the spine tier. Each of the spine switches is, in turn, directly connected to an edge switch, where the edge switch includes a VTEP (VTEP 7). Finally, the edge switch is directly connected to a router. In one embodiment of the invention, the each VTEP on a ToR (e.g., ToR 1) is associated with the IP address and MAC address of the ToR on which it is located.

The aforementioned system is used below to describe various embodiments of the invention. Specifically, the aforementioned system is used to illustrate the different embodiments of overlay routing. However, the invention is not limited to the system shown in FIG. 3.

Figure 4A:
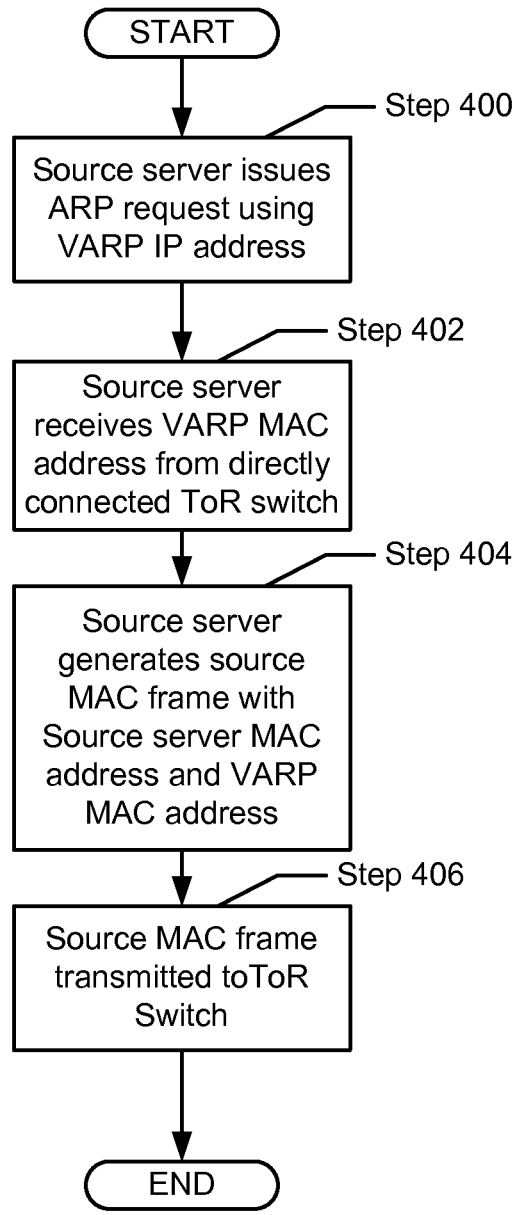
FIG. 4A shows a method for generating a MAC frame in accordance with one or more embodiments of the invention.
Figure 4B:
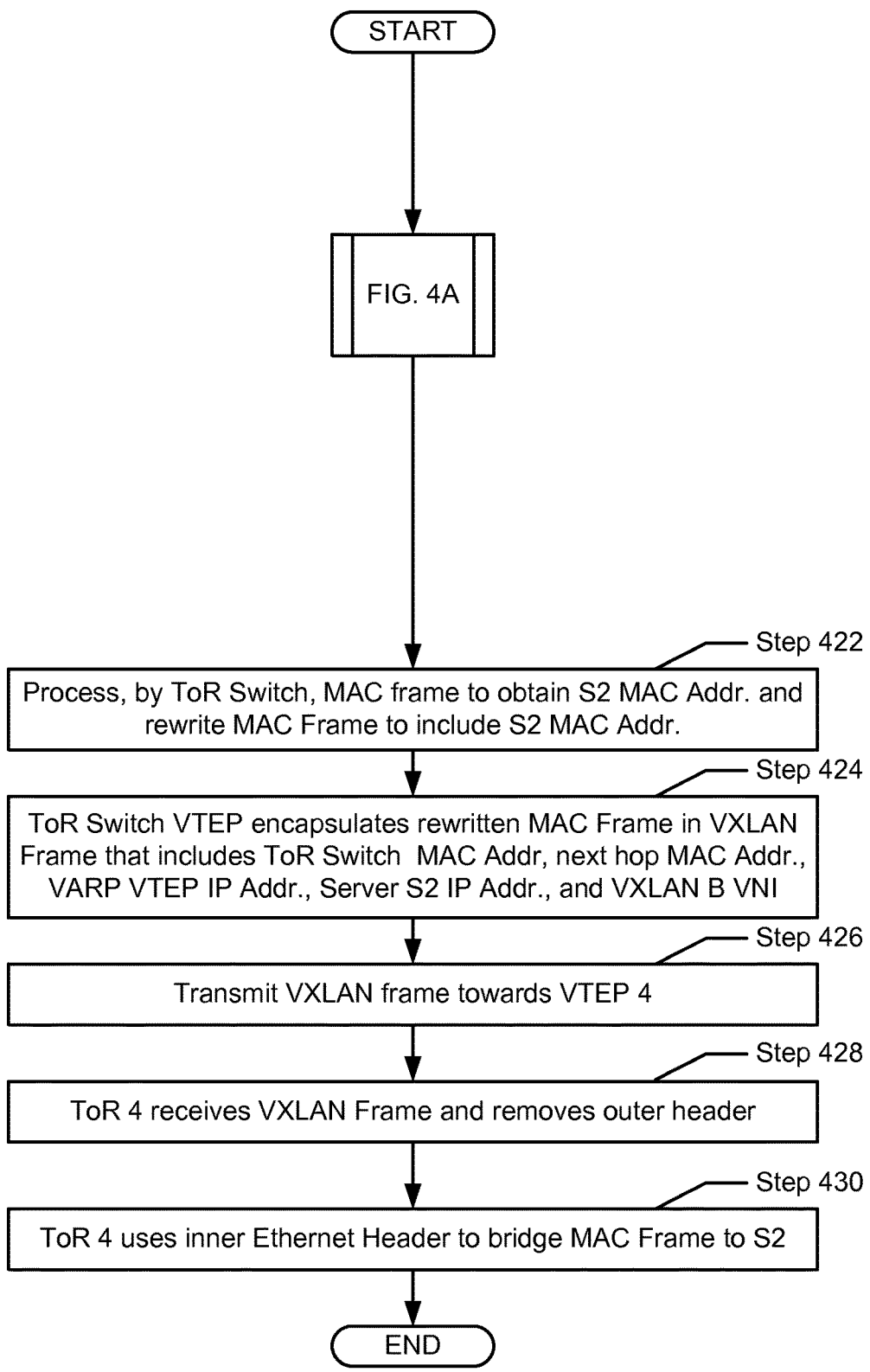
FIG. 4B shows a method for direct overlay routing in accordance with one or more embodiments of the invention.

FIGS. 4A-4B show flowcharts in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIGS. 4A-4B may be performed in parallel with any other steps shown in FIGS. 6 and 8 without departing from the invention.

Turning to FIGS. 4A and 4B, FIGS. 4A and 4B show a method for direct overlay routing in accordance with one or more embodiments of the invention. The following discussion of direct overlay routing is described in relation to the system in FIG. 3; however, embodiments of the invention are not limited to the system shown in FIG. 3.

The method shown in FIGS. 4A-4B describes direct overlay routing to enable first server S1 (also referred to as source server) (associated with VXLAN A) to communicate with a second server S2 (hereafter also referred to as a destination server) (associated with VXLAN B). From the perspective of first server S1, first server S1 is not aware of the VXLAN protocol or of any overlay routing mechanisms; rather, first server S1 operates as if it can communicate directly with second server S2 using conventional routing mechanisms.

In step 400, the source server issues an ARP request using the VARP IP address that is associated with VXLAN A. Prior to issuing the ARP request in step 400, the VARP IP address is set as the default gateway address for the overlay network. A ToR switch implementing one or more embodiments of the invention (e.g., a ToR Switch in the leaf tier (as discussed above)), receives the ARP request and subsequently generates an ARP response that includes the VARP MAC address. In one embodiment of the invention, the ToR switch that sent the ARP response is the ToR Switch that is directly connected to the source server.

In one embodiment of the invention, each ToR switch includes a VARP IP address configured on each switch virtual interface (SVI) for every layer 2 domain with which the ToR switch is associated. For example, if the ToR switch is associated with VXLAN A and VXLAN B, then the VARP IP address assigned to the SVI for VXLAN A may be 192.168.1.1 and VARP IP address assigned to the SVI for VXLAN B may be 192.168.2.1. Each ToR Switch includes a VARP IP address to VARP MAC address mapping, such that when an Address Resolution Protocol (ARP) request includes any VARP IP address, the VARP MAC address is returned in the ARP response. There may be one VARP MAC address for each layer 2 domain.

In one embodiment of the invention, the VARP MAC address corresponds to the MAC address that hosts use to send MAC frames that require routing. Accordingly, when a TOR switch receives a MAC frame that includes a VARP MAC as the destination address, the ToR Switch removes the Ethernet header from the MAC frame and determines the next hop for the IP packet (i.e., IP header and payload).

In Step 402, the source server receives the VARP MAC address (via the ARP response). In Step 404, the source server generates a source MAC frame that includes, at least, (i) the source server MAC address as the source MAC address, (ii) the VARP MAC address as the destination MAC address, (iii) source server S1 IP address as the source IP address, and (iv) source server S2 IP address as the destination IP address. In one embodiment of the invention, the MAC frame may also include an IEEE 802.1Q tag, which corresponds to the VLAN with which the MAC frame is associated. When present, the ToR Switch may use the 802.1Q tag to determine the layer 2 domain with which the MAC frame is associated. In Step 406, the source MAC frame (generated in Step 404) is transmitted towards the ToR Switch.

Referring to FIG. 4B, in step 422, after receiving the MAC frame, the ToR switch processes the MAC frame in order to obtain a rewritten MAC frame. More specifically, in one embodiment of the invention, the ToR switch first uses the 802.1Q tag (if present) or the ingress interface on the ToR Switch on which the MAC frame was received to determine the layer 2 domain with which the MAC frame is associated. Once the layer 2 domain is determined, the TOR switch may trap and process the MAC frame (as explained below) if the destination MAC address corresponds to a MAC address on the ToR switch that is associated with the layer 2 domain (i.e., the layer 2 domain for the MAC frame). When the destination MAC address, i.e., the VARP MAC address, is determined to be in same layer 2 domain as the ToR Switch, the ToR Switch performs a routing function using the second server IP address in order to determine that the ToR switch is directly connected (from an IP point of view) to the second server S2. In one embodiment of the invention, ToR switch routes the MAC frame as it is operating as a default gateway. Based on this determination, the second server S2 MAC address is obtained. In one embodiment of the invention, ARP may be used to obtain the second server S2 MAC address. In one embodiment of the invention, the ToR switch includes a routing table entry for each subnet that includes servers connected to the leaf tier (see e.g., FIG. 3). In one embodiment of the invention, the ToR switch includes two routing tables: one for the overlay network, and one for the underlay network. The underlay routing table includes a route for each subnet of servers or other equipment attached to the leaf tier, and one or more routes (possibly including a default route) pointing towards external network elements. The overlay routing table includes information about the IP segments carried by each layer 2 domain. In another embodiment, there is only one routing table that includes both underlay network and overlay network routes. In another embodiment, there is one underlay routing table and a number of overlay routing tables (e.g., one overlay routing table per routing domain, which possibly correspond to different tenants in a multi-tenant data center).

Continuing with the discussion of FIG. 4B, in the instant example, the inner MAC frame received in the VXLAN frame in step 422 is rewritten to remove the ToR Switch MAC address as the destination MAC address and to replace it with the second server S2 MAC address. Further, the source MAC address in the inner MAC frame may be replaced with VARP MAC address. (See e.g., FIG. 5C).

Continuing with the discussion of FIG. 4B, in step 424, the VTEP on the ToR Switch encapsulates the rewritten MAC frame (obtained in step 422) in a VXLAN frame. More specifically, the VXLAN frame includes an outer header with the following information: ToR switch MAC address (as the source MAC address), a MAC address of next hop (as the destination MAC address), a VARP VTEP IP address (as the source IP address), an IP address of ToR switch 4 (as the destination IP address), and VNI B (i.e., the VNI associated with VXLAN B). The destination IP address in the outer header corresponds to a destination for the VXLAN frame (i.e., ToR switch 4) that includes the VTEP that will decapsulate the VXLAN frame generated in step 424. The destination IP address may be determined using the second server S2 IP address. Finally, VNI B is included in the VXLAN frame because second server S2 is associated with VNI B and, as such, VNI B is required to be included for second server S2 to ultimately receive the MAC frame generated in step 422.

Continuing with the discussion on FIG. 4B, in step 426, the VXLAN frame generated in step 416, is transmitted, via the IP Fabric, to the VTEP on ToR switch 4. The VXLAN frame is transmitted in accordance with standard IP routing mechanisms through the IP fabric until it reach ToR switch 4. In this example, the VXLAN frame may be transmitted to spine switch 2 and spine switch 2 may subsequently transmit the VXLAN frame to ToR switch 4. Those skilled in the art will appreciate the outer Ethernet header of the VXLAN frame is rewritten at each hop in the IP fabric until it reaches server ToR switch 4.

In step 428, the VTEP on the ToR switch 4 receives the VXLAN frame from ToR switch 4 and removes the outer header (see e.g., 232 in FIG. 2) to obtain the MAC frame (generated in Step 408). In step 430, the VTEP on ToR switch 4 bridges (i.e., sends using the destination MAC address in the MAC frame) the MAC frame to second server S2. Second server S2 subsequently processes the MAC frame and extracts the payload.

Figure 5A:
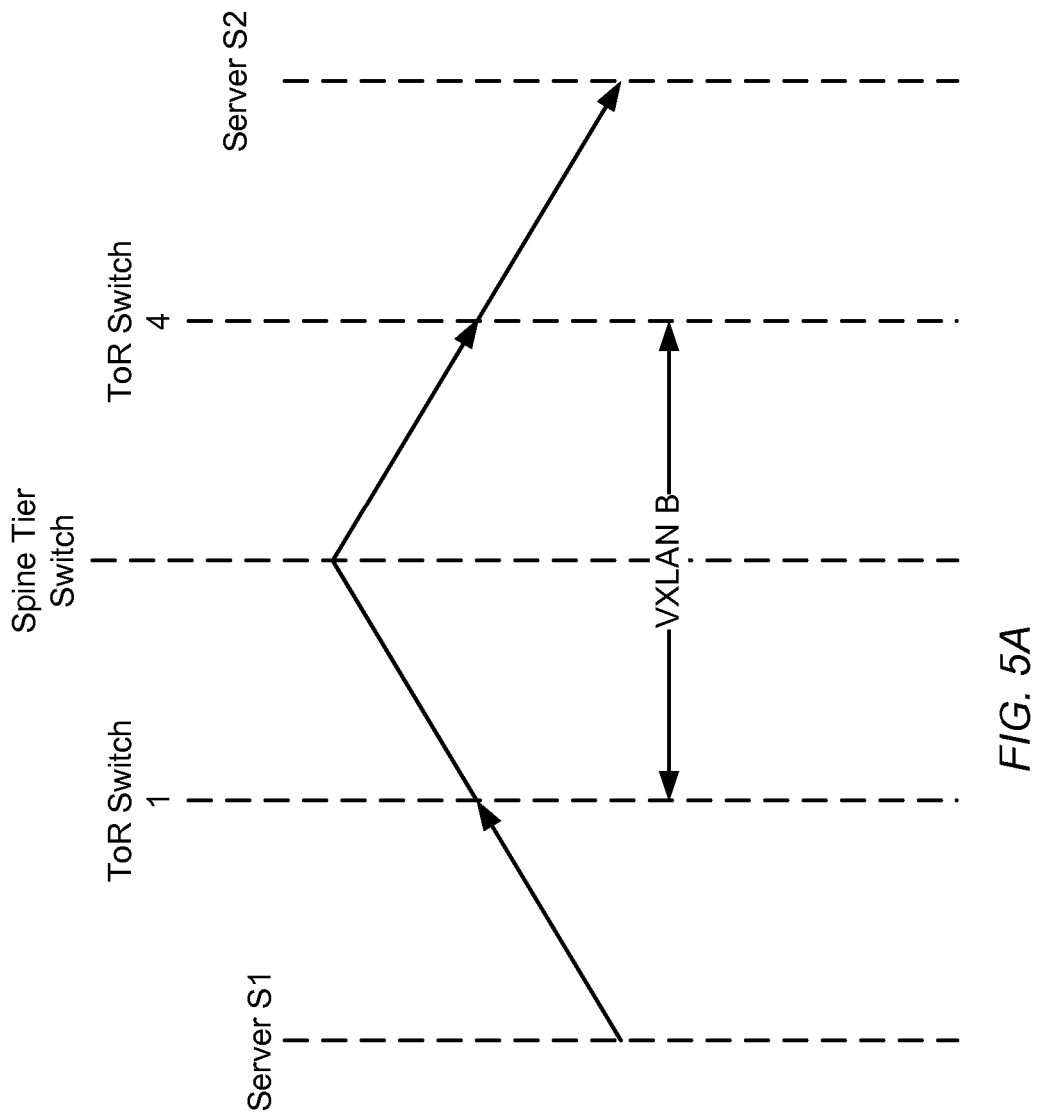
FIG. 5A shows an exemplary path of a payload transmitted using direct overlay routing in accordance with one or more embodiments of the invention.

FIG. 5A shows an exemplary path of a payload transmitted using direct overlay routing in accordance with one or more embodiments of the invention. More specifically, FIG. 5A shows an exemplary path the payload from first server S1 may take to reach second server S2. The exemplary path tracks the path described in FIGS. 4A-4B. The components shown in FIG. 5A correspond to like named components in FIG. 3 and FIGS. 4A-4B. Turning to FIG. 5A, when the initial MAC frame is transmitted by server S1 to ToR switch 1, the MAC frame is transmitted on a layer 2 domain associated with VXLAN A but is not encapsulated in a VXLAN frame. The initial MAC frame is generated in accordance with FIG. 4A. FIG. 5B shows a source MAC frame (500) generated in accordance with FIG. 4A. Continuing with the discussion of FIG. 5A, at ToR switch 1, after the routing of the MAC frame (see Step 422 in FIG. 4B), the new resulting MAC frame (see FIG. 5C, 502) is encapsulated into a VXLAN frame (see FIG. 5D, 504) and transmitted towards ToR switch 4. The new VXLAN frame is transmitted on VXLAN B. Embodiments of the invention enable ToR switch 1 switch to take a MAC frame received via one VXLAN and transmit the MAC frame (a portion of which is rewritten) via a separate VXLAN. In one embodiment of the invention, this functionality is achieved by first routing the MAC frame and then generating and IP forwarding the VXLAN frame.

Figure 6:
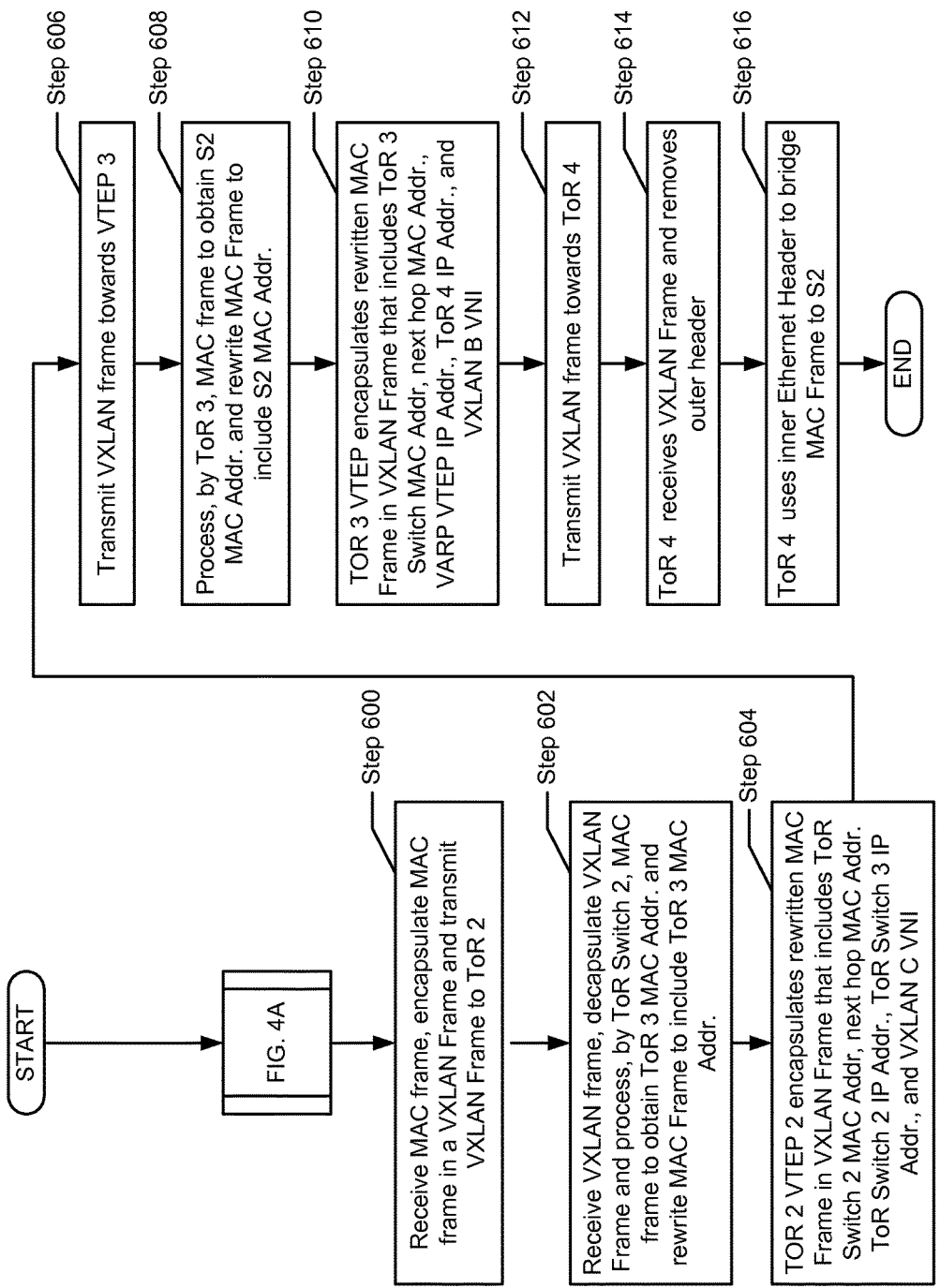
FIG. 6 shows a method for indirect overlay routing in accordance with one or more embodiments of the invention.

FIG. 6 shows a flowchart in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIG. 6 may be performed in parallel with any other steps shown in FIGS. 4A, 4B and 8 without departing from the invention.

Turning to FIG. 6, FIG. 6 shows a method for indirect overlay routing in accordance with one or more embodiments of the invention. The following discussion of indirect overlay routing is described in relation to the system in FIG. 3; however, embodiments of the invention are not limited to the system shown in FIG. 3.

The method shown in FIG. 6 describes indirect overlay routing to enable first server S1 (associated with VXLAN A) to communicate with second server S2 (associated with VXLAN B). From the perspective of first server S1, first server S1 is not aware of the VXLAN protocol or of any overlay routing; rather, first server S1 operates as if it can communicate directly with second server S2 using conventional routing mechanisms.

In one embodiment of the invention, indirect overlay routing utilizes multiple VARP MAC addresses and VARP VTEP IP addresses, where different VARP MAC addresses and VARP VTEP IP addresses are used for different layer 2 domains. Accordingly, the specific VARP MAC and VARP VTEP IP address pair that is present in a given VXLAN Frame may vary based upon the layer 2 domain with which the VXLAN frame is associated. Said another way, because different ToR switches route in and out of different layer 2 domains of VXLAN, it is essential that the VXLAN frames issued reach the appropriate ToR Switch (i.e., the ToR switch that has the appropriate routing information). This is enabled by using distinct VARP VTEP IP address and VARP MAC address combinations.

In Step 600, the MAC frame is received by ToR switch 1. In one embodiment of the invention, the generation of the MAC frame that is transmitted from the source server to ToR switch 1 is performed in accordance with FIG. 4A. The MAC frame is subsequently bridged by ToR switch 1 (i.e., the headers in the MAC frame are not rewritten). The MAC frame that includes the following: (i) source server S1 MAC address as the source MAC address; (ii) the VARP MAC address for VXLAN A as the destination MAC address; (iii) the source server S1 IP address as the source IP address; and (iv) the second server S2 IP address as the destination IP address. The MAC frame is subsequently encapsulated in a VXLAN frame where the outer header includes: (i) a ToR switch 1 switch MAC address as the source MAC address (e.g., ToR 1 switch router MAC address); (ii) a next hop MAC address as the destination MAC address; (iii) a ToR switch 1 IP address as the source IP address (e.g., ToR 1 switch VTEP IP address); and (iv) a VARP VTEP IP address as the destination IP address (e.g., an IP address associated with a virtual VTEP IP address on ToR switch 2). Further, the VXLAN frame includes a VNI A associated with VXLAN A. The VNI may be determined using a IEEE 802.1Q tag (if present) on the MAC frame issued by the source server S1 or, alternatively, the ingress port on the ToR switch 1 upon which the MAC frame was received. Once the VXLAN frame is generated it is transmitted towards ToR switch 2.

Continuing with step 602, the ToR switch 2 receives the VXLAN frame issued by ToR switch 1, decapsulates the MAC frame, and processes the MAC frame in order to obtain a rewritten MAC frame. In one embodiment of the invention, ToR switch 2 routes the MAC frame as it is operating as a default gateway. More specifically, in one embodiment of the invention, the ToR switch 2 performs a routing function using the second server IP address in order to determine that ToR switch 2 is directly connected to ToR Switch 3(from an IP point of view). Based on this determination, the next hop MAC address for the MAC frame is obtained, which in this example is the MAC address of ToR Switch 3 . In one embodiment of the invention, the IP fabric includes a dedicated layer 2 network (with a dedicated VNI) interconnecting all ToR switch routing functions thereby enabling the ToR switches to exchange information (e.g., using interior gateway protocol (IGP)) about which ToR switch provides routes to which overlay subnet(s).

For purposes of this explanation, assume that the routing table in ToR switch 2 includes a route table entry specifying a route to the appropriate ToR switch from which second server S2 may be accessed. Further, assume that the routing table entry indicates that second server S2 is reachable via ToR switch 3 . Accordingly, the MAC frame received in the VXLAN frame in step 602 is rewritten to include the following: (i) ToR switch 2 MAC address as the source MAC address; (ii) the ToR switch 3 MAC address as the destination MAC address; (iii) the source server S1 IP address as the source IP address; and (iv) the second server S2 IP address as the destination IP address.

Continuing with the discussion of FIG. 6, in step 604, the VTEP on ToR Switch 2 encapsulates the rewritten MAC frame (obtained in step 602) in a VXLAN frame. More specifically, the VXLAN frame includes an outer header with the following information: a MAC address of the ToR Switch 2 (as the source MAC address), a MAC address of the next hop (e.g., the MAC address Spine Tier Switch 2) (as the destination MAC address), an IP address of ToR switch 2 (as the source IP address), an IP address of ToR switch 3 (as the destination IP address), and VNI C (i.e., the VNI associated with VXLAN C). The destination IP address in the outer header corresponds to ToR switch that includes the VTEP that will decapsulate the VXLAN frame generated in step 604. The destination VTEP may be determined using the second server S2 IP address. Finally, VNI C is included in the VXLAN frame because ToR switch 3 is associated with VNI C and, as such, VNI C is required to be included for ToR switch 3to ultimately receive the MAC frame generated in step 604.

Continuing with the discussion on FIG. 6, in step 606, the VXLAN frame generated in step 604 is transmitted, via the IP Fabric, to ToR switch 3 . The VXLAN frame is forwarded in accordance with standard IP routing mechanisms through the IP fabric until it reaches ToR switch 3 . In this example, the VXLAN frame may be transmitted to spine switch 2 and spine switch 2 may subsequently route the VXLAN frame to ToR switch 3 . Those skilled in the art will appreciate the outer Ethernet header of the VXLAN frame is rewritten at each hop it traverses in the IP Fabric.

In step 608, the VTEP on ToR switch 3 receives the VXLAN frame from ToR switch 2 and removes the outer header (see e.g., 232 in FIG. 2) to obtain the MAC frame (generated in Step 602). ToR switch 3 subsequently processes the MAC frame in order to obtain a rewritten MAC frame. More specifically, in one embodiment of the invention, ToR switch 3 performs a routing function using the second server S2 IP address in order to obtain the second server S2 MAC address. In one embodiment of the invention, ToR switch 3 includes a routing table, where the routing table includes a routing table entry for second server S2. Accordingly, in the instant example, the MAC frame received in the VXLAN frame in step 608 is rewritten to remove the ToR switch 3 MAC address as the destination MAC address and to replace it with the second server S2 MAC address. Further, the source MAC address in the inner frame is the VARP MAC address for VXLAN B.

Continuing with the discussion of FIG. 6, in step 610, the VTEP on ToR switch 3 encapsulates the rewritten MAC frame (obtained in step 608) in a VXLAN frame. More specifically, the VXLAN frame includes an outer header with the following information: a MAC address of ToR switch 3 (as the source MAC address), a MAC address of the next hop (e.g., Spine Tier Switch 3 (as the destination MAC address), a VARP VTEP IP address for VXLAN B (as the source IP address), an IP address of ToR Switch 4 (as the destination IP address), and VNI B (i.e., the VNI associated with VXLAN B). The destination IP address in the outer header corresponds to ToR switch 4, which includes the VTEP that will decapsulate the VXLAN frame generated in step 610. The destination VTEP may be determined using the ToR switch 4 IP address. Finally, VNI B is included in the VXLAN frame because source server S2 is associated with VNI B and, as such, VNI B is required to be included for source server S2 to ultimately receive the MAC frame generated in step 610. In one embodiment of the invention, the ToR switch 3 MAC address may be used in place of the VARP MAC address as the inner frame source MAC address and the ToR switch 3 IP address may be used in place of the VARP VTEP IP address as the outer source IP address.

Continuing with the discussion on FIG. 6, in step 612, the VXLAN frame generated in step 610, is transmitted, via the IP Fabric, to ToR switch 4. The VXLAN frame is routed in accordance with standard IP routing mechanisms through the IP fabric until it reaches ToR switch 4. In this example, the VXLAN frame may be transmitted to spine switch 3 and spine switch 3 may subsequently route the VXLAN frame to ToR switch 4. Those skilled in the art will appreciate the outer Ethernet header of the VXLAN frame is rewritten at each hop it traverses in the IP Fabric.

In step 614, the VTEP on the ToR switch 4 receives the VXLAN frame and removes the outer header (see e.g., 232 in FIG. 2) to obtain the MAC frame (generated in Step 608). In step 616, the VTEP on ToR switch 4 bridges (i.e., sends using the destination MAC address in the MAC frame) the MAC frame to second server S2. Second server S2 subsequently processes the MAC frame and extracts the payload.

In one or more embodiments of the invention, unlike the direct overlay routing embodiment, each of the ToR switches in the leaf tier only includes routing table entries for a subset of servers. However, each of the ToR switches includes routing table entries for each of the other ToR switches, where the routing table entries indicate which subset of servers may be directly routed to by a given ToR switch. The ToR switches share the aforementioned routing information, for example, using interior gateway protocol (IGP). In addition, unlike the direct overlay routing embodiment, the indirect overlay routing embodiment uses a separate layer 2 domain for ToR switch-to-ToR switch communication.

Figure 7:
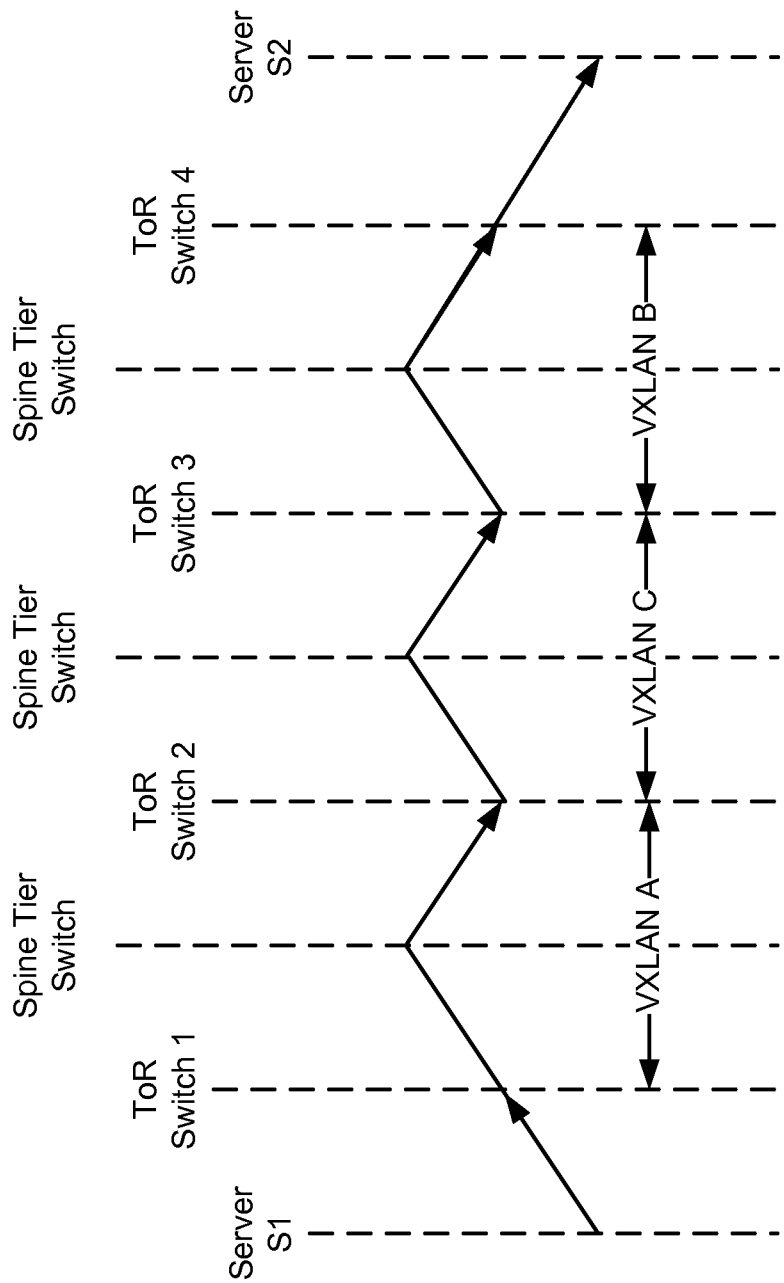
FIG. 7 shows an exemplary path of a payload transmitted using indirect overlay routing in accordance with one or more embodiments of the invention.

FIG. 7 shows an exemplary path of a payload transmitted using indirect overlay routing in accordance with one or more embodiments of the invention. More specifically, FIG. 7 shows an exemplary path the payload from first server S1 may take to reach second server S2. The exemplary path tracks the path described in FIG. 6. The components shown in FIG. 7 correspond to like named components in FIG. 3 and FIG. 6. Turning to FIG. 7, the initial MAC frame is sent by server S1 to ToR switch 1. Upon receipt by ToR switch 1, the MAC frame is bridged and then encapsulated into a VXLAN frame. The resulting VXLAN frame is then transmitted towards ToR switch 2. The aforementioned VXLAN frame is transmitted on a layer 2 domain associated with VXLAN A. The VXLAN frame is generated in accordance with FIGS. 4A and 6. At ToR switch 2, after the routing of the MAC frame (see Step 602 in FIG. 6), the new resulting MAC frame is encapsulated into a new VXLAN frame and routed to ToR switch 3 (via a spine tier switch). The new VXLAN frame is transmitted on VXLAN C. After receiving the VXLAN frame from ToR switch 2, ToR switch 3 routes the MAC frame (see Step 608 in FIG. 6). The new resulting MAC frame is encapsulated into a new VXLAN frame and transmitted to server ToR switch 4 on VXLAN B. ToR switch subsequently receives, decapsulates, and bridges the MAC frame to server S2.

Embodiments of the invention enable ToR switch 2 and ToR switch 3 to take a MAC frame received via one VXLAN and transmit the MAC frame (a portion of which is rewritten) and transmit it in via a separate VXLAN. In one embodiment of the invention, this functionality is achieved by first routing the MAC frame and then forwarding the VXLAN frame.

Figure 8:
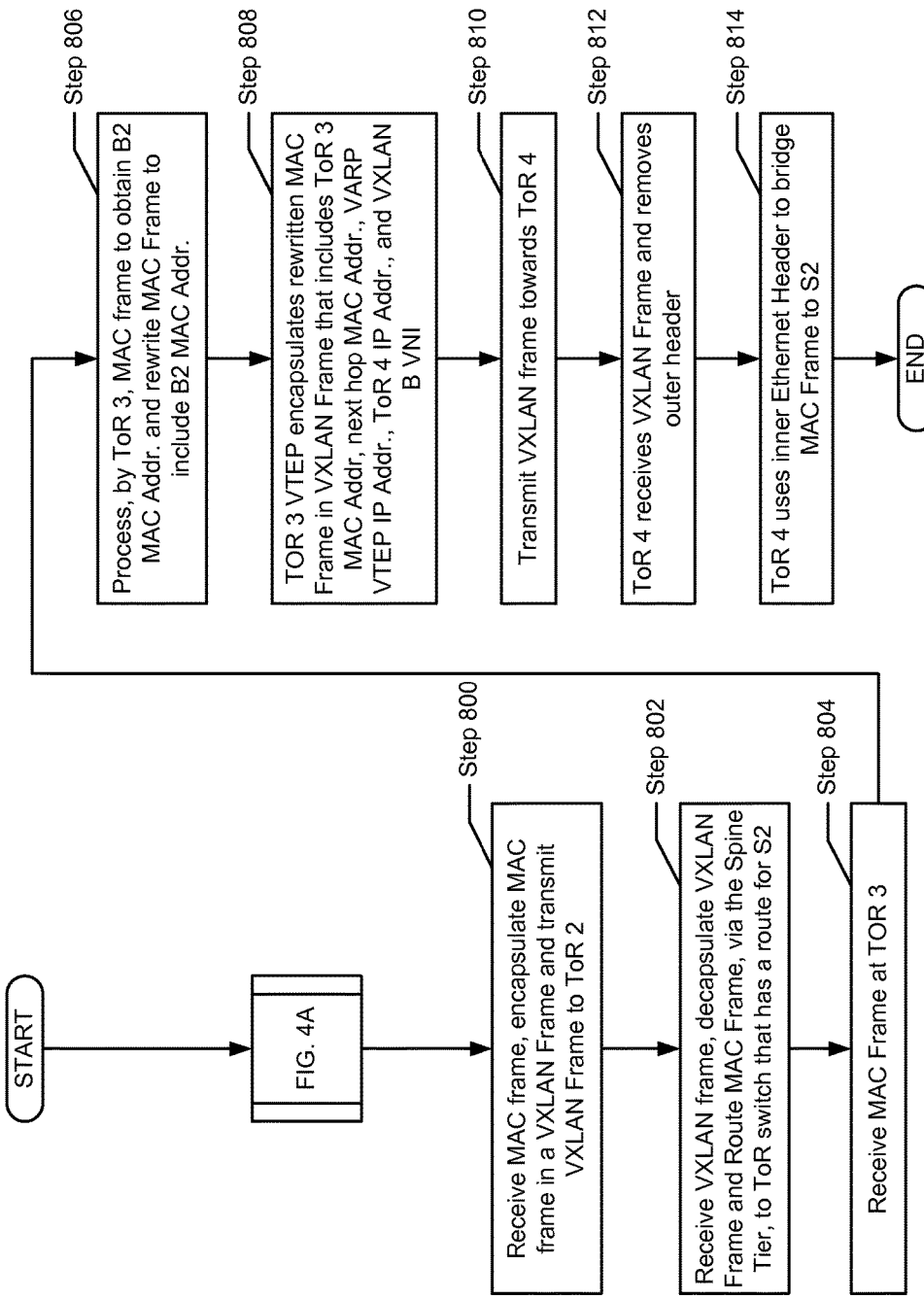
FIG. 8 shows a method for naked overlay routing in accordance with one or more embodiments of the invention.

FIG. 8 shows a flowchart in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIG. 8 may be performed in parallel with any other steps shown in FIGS. 4A-4B and 6 without departing from the invention.

Turning to FIG. 8, FIG. 8 shows a method for naked overlay routing in accordance with one or more embodiments of the invention. The following discussion of naked overlay routing is described in relation to the system in FIG. 3; however, embodiments of the invention are not limited to the system shown in FIG. 3.

The method shown in FIG. 8 describes naked overlay routing to enable first server S1 (associated with VXLAN A) to communicate with a second server (associated with VXLAN B). From the perspective of the first server S1, first server S1 is not aware of the VXLAN protocol or of any overlay routing; rather, first server operates as if it can communicate directly with second server S2 using conventional routing mechanisms.

In one embodiment of the invention, naked overlay routing utilizes multiple VARP MAC addresses and VARP VTEP IP addresses, where different VARP MAC addresses and VARP VTEP IP addresses are used for different layer 2 domains. Accordingly, the specific VARP MAC address and VARP VTEP IP address pair that is present in a given VXLAN Frame may vary based upon the layer 2 domain with which the VXLAN frame is associated. Said another way, because different ToR switches route in and out of different layer 2 domains of VXLAN, it is essential that the VXLAN frames issued reach the appropriate ToR Switch (i.e., the ToR switch that has the appropriate routing information). This is enabled by using distinct VARP VTEP IP address and VARP MAC address combinations.

In step 800, the MAC frame is received by ToR switch 1. In one embodiment of the invention, the generation of the MAC frame that is transmitted from the source server to ToR switch 1 is performed in accordance with FIG. 4A. The MAC frame is subsequently bridged by ToR switch 1 (i.e., the headers in the MAC frame are not rewritten). The MAC frame that includes the following: (i) source server S1 MAC address as the source MAC address; (ii) the VARP MAC address for VXLAN A as the destination MAC address; (iii) the source server S1 IP address as the source IP address; and (iv) the second server S2 IP address as the destination IP address. The MAC frame is subsequently encapsulated in a VXLAN frame where the outer header includes: (i) a ToR switch 1 switch MAC address as the source MAC address (e.g., ToR 1 switch router MAC address); (ii) a next hop MAC address as the destination MAC address; (iii) a ToR switch 1 IP address as the source IP address (e.g., ToR 1 switch VTEP IP address); and (iv) a VARP VTEP IP address as the destination IP address (e.g., an IP address associated with the virtual VTEP IP address on ToR switch 2). Further, the VXLAN frame includes a VNI A associated with VXLAN A. The VNI may be determined using a IEEE 802.1Q tag (if present) on the MAC frame issued by the source server S1 or, alternatively, the ingress port on the ToR switch 1 upon which the MAC frame was received. Once the VXLAN frame is generated it is transmitted towards ToR switch 2.

Continuing with the discussion of FIG. 8, in step 802, receives the VXLAN frame issued by ToR switch 1 and decapsulates the MAC. The decapsulated MAC frame is subsequently routed, via the IP fabric, to a ToR switch from which second server S2 may be reached. In one embodiment of the invention, ToR switch 2 routes the MAC frame as it is operating as a default gateway. For purposes of this explanation, assume second server S2 may be reached via ToR switch 3. Further, assume that the routing table in ToR switch 2 includes a routing table entry specifying a route determined using second server S2 IP address, where the routing table entry indicates that second server S2 is reachable via spine switch 2. Accordingly, ToR switch 2 generates a rewritten MAC frame that includes the ToR switch 2 MAC address as the source MAC address and the spine switch 2 MAC address as the destination MAC address. The rewritten MAC frame is subsequently transmitted to spine switch 2. Spine switch 2, upon receipt of the rewritten MAC frame, performs a routing function using the second server S2 IP address and determines that the next hop is ToR switch 3. Spine switch 2 rewrites the MAC frame it received to remove the Spine switch 2 MAC address as the destination MAC address and to replace it with the ToR switch 3 MAC address. The rewritten MAC frame is subsequently transmitted to ToR switch 3. The routing of the MAC frame between ToR switch 2 and ToR switch 3 does not include any VXLAN encapsulation.

Continuing with the discussion of FIG. 8, in step 804, the ToR switch 3 receives the MAC frame from spine switch 2. In Step 806, ToR switch 3 processes the MAC frame in order to obtain a rewritten MAC frame. More specifically, in one embodiment of the invention, ToR switch 3 performs a routing function using the second server S2 IP address in order to obtain the second server S2 MAC address. In one embodiment of the invention, ToR switch 3 includes a routing table, where the routing table includes a routing table entry for second server S2. Accordingly, in the instant example, the MAC frame received in step 804 is rewritten to remove the ToR switch 3 MAC address as the destination MAC address and to replace it with the second server S2 MAC address. Further, the source MAC address in the inner frame is VARP MAC address for VXLAN B.

Continuing with the discussion of FIG. 8, in step 808, the VTEP on ToR switch 3 encapsulates the rewritten MAC frame (obtained in step 806) in a VXLAN frame. More specifically, the VXLAN frame includes an outer header with the following information: a MAC address of ToR switch 3 (as the source MAC address), a MAC address of the next hop (i.e., MAC address of Server S2) (as the destination MAC address), a VARP VTEP IP address for VXLAN B (as the source IP address), an IP address of ToR switch 4 (as the destination IP address), and VNI B (i.e., the VNI associated with VXLAN B). The destination IP address in the outer header corresponds to ToR switch 4 that includes the VTEP that will decapsulate the VXLAN frame generated in step 808. The destination IP address may be determined using the second server S2 IP address. Finally, VNI B is included in the VXLAN frame because second server S2 is associated with VNI B and, as such, VNI B is required to be included for second server S2 to ultimately receive the MAC frame generated in step 808. In one embodiment of the invention, the ToR switch 3 MAC address may be used in place of the VARP MAC address and the ToR switch 3 IP address may be used in place of the VARP VTEP IP address.

Continuing with the discussion on FIG. 8, in step 810, the VXLAN frame generated in step 808, is transmitted, via the IP fabric, to the VTEP on ToR switch 4. The VXLAN frame is routed in accordance with standard IP routing mechanisms through the IP fabric until it reaches ToR switch 4. In this example, the VXLAN frame may be transmitted to spine switch 2 and spine switch 2 may subsequently transmit the VXLAN frame to ToR switch 4. Those skilled in the art will appreciate the outer Ethernet header of the VXLAN frame is rewritten at hop is traversed in the IP Fabric.

In step 812, the VTEP on the ToR switch 4 receives the VXLAN frame and removes the outer header (see e.g., 232 in FIG. 2) to obtain the MAC frame (generated in Step 806). In step 814, the VTEP on ToR switch 4 bridges (i.e., sends using the destination MAC address in the MAC frame) the MAC frame to second server S2. Second server S2 subsequently processes the MAC frame and extracts the payload.

Naked overlay routing is similar to indirect overlay routing in that the payload from the first server S1 traverses the same number of switches in both of the aforementioned embodiments of overlay routing. However, naked overlay routing does not require the additional layer 2 domain from the ToR switches. Instead, naked overlay routing requires the participation of the spine switches, where the spine switches have knowledge (via their routing tables) about which layer 2 domains are accessible by each ToR. In contrast, in the indirect overlay routing embodiment, the spine switches are not aware of which layer 2 domains are accessible by each ToR.

Figure 9:
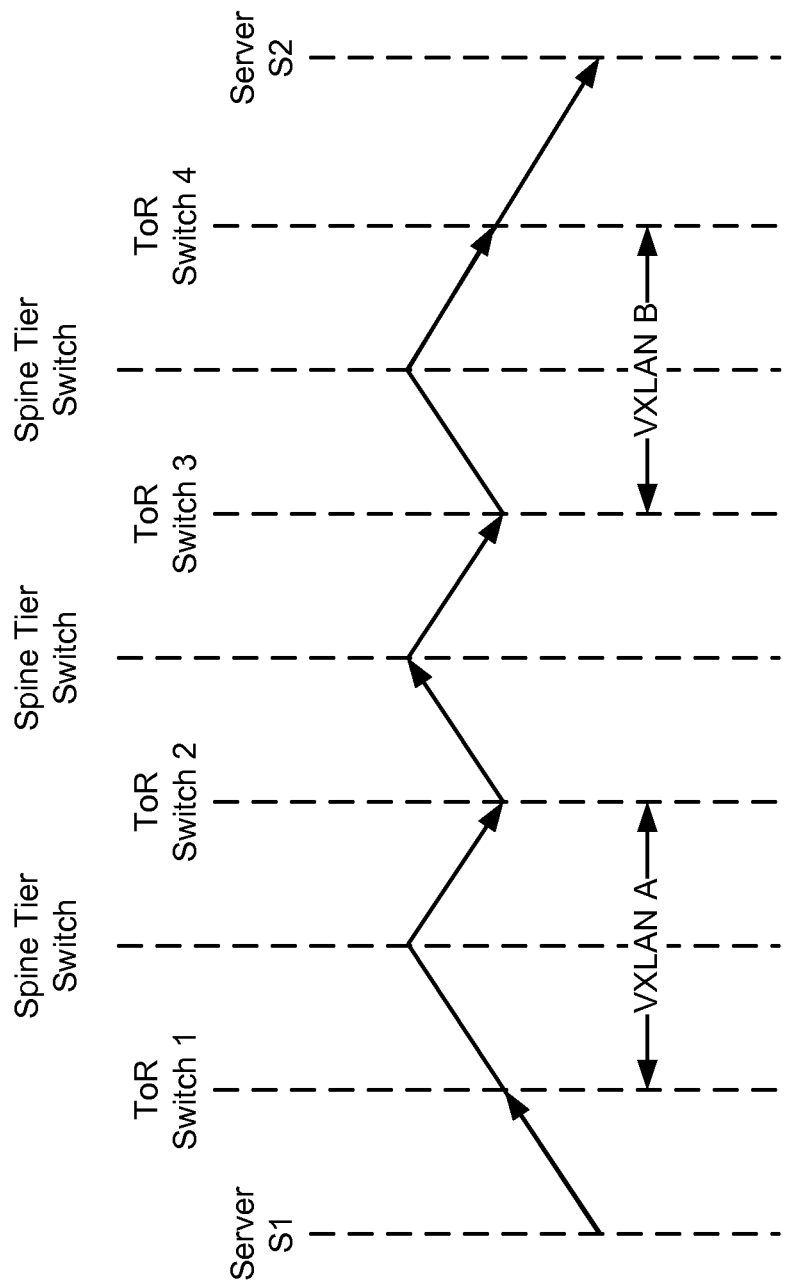
FIG. 9 shows an exemplary path of a payload transmitted using naked overlay routing in accordance with one or more embodiments of the invention.

FIG. 9 shows an exemplary path of a payload transmitted using naked overlay routing in accordance with one or more embodiments of the invention. More specifically, FIG. 9 shows an exemplary path the payload from source server S1 may take to reach second server S2. The exemplary path tracks the path described in FIG. 8. The components shown in FIG. 9 correspond to like named components in FIG. 3 and FIG. 8. Turning to FIG. 9, when the initial MAC frame including the payload) is transmitted by server S1 to ToR switch 2 (via a number of intermediate switches). The MAC frame is transmitted on a layer 2 domain associated with VXLAN A but is not encapsulated in a VXLAN frame. The initial MAC frame is generated in accordance with FIGS. 4A and 8. At ToR switch 2, the MAC frame is routed (without VXLAN) to ToR switch 3 via a spine tier switch. After receiving the MAC frame from the spine tier switch, ToR switch 3 routes the MAC frame (see Step 808 in FIG. 8). The new resulting MAC frame is encapsulated into a new VXLAN frame and transmitted to server S2 on VXLAN B.

Embodiments of the invention enable ToR switch 2 to take a MAC frame received via one VXLAN and transmit the MAC frame (a portion of which is rewritten) and transmit it via a separate VXLAN. In one embodiment of the invention, this functionality is achieved by first routing the MAC frame and then transmitting the VXLAN frame.

In one embodiment of the invention, the network topology may be arranged such that for a given layer 2 domain it may (i) use direct overlay routing to communicate with a first set of other layer 2 domains and (ii) use indirect and/or naked routing to communicate with a second set of layer 2 domains.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for routing, comprising:
   receiving, on a first network device, a media access control (MAC) frame in a layer 2 domain, the MAC frame comprising a VARP MAC address, a first server Internet Protocol (IP) address associated with a first server, and a second server IP address associated with a second server;
   making a first determination that the MAC frame comprises the VARP MAC address, wherein the VARP MAC address is in the layer 2 domain;
   based on the first determination, generating a rewritten MAC frame comprising a second server MAC address associated with the second server and the VARP MAC address as a source MAC address in the rewritten MAC frame;
   generating, by the first network device, a first Virtual eXtensible Local Area Network (VXLAN) frame comprising a next hop MAC address, a second network device IP address, a virtual network identifier (VNI), and the rewritten MAC frame;
   routing the first VXLAN frame through an IP fabric to a second network device associated with the second network device IP address, wherein the IP Fabric comprises the first network device, the second network device, and wherein the second server is connected to the second network device; and
   receiving, by the first network device, a second VXLAN frame comprising the VNI and a second MAC frame, wherein the second MAC frame comprises the VARP MAC address as a source MAC address in the second MAC frame, wherein the second VXLAN frame originated from the second network device.

2. The method of claim 1, wherein generating the MAC frame comprises executing a routing function to identify a routing table entry using the second server IP address, wherein the first network device comprises a routing table that includes the routing table entry, wherein the routing table entry indicates that a next hop is the second server IP address, wherein the second server MAC address is obtained based on the determination that the next hop is the second server IP address.

3. The method of claim 1, wherein generating the first VXLAN frame comprises determining the next hop MAC address in the IP fabric, wherein the next hop MAC address is not the second server.

4. The method of claim 3, wherein the next hop MAC address is associated with a third network device in the IP fabric.

5. The method of claim 1, wherein the first network device is a switch.

6. A non-transitory computer readable medium comprising instructions, which when
   executed by a processor, cause the processor to perform a method, the method comprising:
   receiving, on a first network device, a media access control (MAC) frame in a layer 2 domain, the MAC frame comprising a VARP MAC address, a first server Internet Protocol (IP) address associated with a first server, and a second server IP address associated with a second server;
   making a first determination that the MAC frame comprises the VARP MAC address wherein the VARP MAC address is in the layer 2 domain;
   based on the first determination, generating a rewritten MAC frame comprising a second server MAC address associated with the second server and the VARP MAC address as a source MAC address in the rewritten MAC frame;
   generating, by the first network device, a first Virtual eXtensible Local Area Network (VXLAN) frame comprising a next hop MAC address, a second network device IP address, a virtual network identifier (VNI), and the rewritten MAC frame;
   routing the first VXLAN frame through an IP fabric to a second network device associated with the second network device IP address, wherein the IP Fabric comprises the first network device, the second network device, and wherein the second server is connected to the second network device; and
   receiving, by the first network device, a second VXLAN frame comprising the VNI and a second MAC frame, wherein the second MAC frame comprises the VARP MAC address as a source MAC address in the second MAC frame, wherein the second VXLAN frame originated from the second network device.

7. The non-transitory computer readable medium of claim 5, wherein generating the MAC frame comprises executing a routing function to identify a routing table entry using the second server IP address, wherein the first network device comprises a routing table that includes the routing table entry, wherein the routing table entry indicates that a next hop is the second server IP address, wherein the second server MAC address is obtained based on the determination that the next hop is the second server IP address.

8. The non-transitory computer readable medium of claim 5, wherein generating the first VXLAN frame comprises determining the next hop MAC address in the IP fabric, wherein the next hop MAC address is not the second server.

9. The non-transitory computer readable medium of claim 8, wherein the next hop MAC address is associated with a third network device in the IP fabric.

10. The non-transitory computer readable medium of claim 5, wherein the first network device is a switch.

11. A network device, comprising:
    a processor;

a plurality of ports;
a physical memory comprising computer readable instructions, which when executed by the processor, cause the processor to perform a method, the method comprising:
   receiving, on the network device, a media access control (MAC) frame in a layer 2 domain, the MAC frame comprising a VARP MAC address, a first server Internet Protocol (IP) address associated with a first server, and a second server IP address associated with a second server;
   making a first determination that the MAC frame comprises the VARP MAC address, wherein the VARP MAC address is in the layer 2 domain;
   based on the first determination, generating a rewritten MAC frame comprising a second server MAC address associated with the second server and the VARP MAC address as a source MAC address in the rewritten MAC frame;
   generating, by the network device, a first Virtual eXtensible Local Area Network (VXLAN) frame comprising a next hop MAC address, a second network device IP address, a virtual network identifier (VNI), and the rewritten MAC frame;
   routing the first VXLAN frame through an IP fabric to a second network device associated with the second network device IP address, wherein the IP Fabric comprises the network device, the second network device, and wherein the second server is connected to the second network device; and
   receiving, by the network device, a second VXLAN frame comprising the VNI and a second MAC frame, wherein the second MAC frame comprises the VARP MAC address as a source MAC address in the second MAC frame, wherein the second VXLAN frame originated from the second network device.

12. The network device of claim 11, wherein generating the MAC frame comprises executing a routing function to identify a routing table entry using the second server IP address, wherein the network device comprises a routing table that includes the routing table entry, wherein the routing table entry indicates that a next hop is the second server IP address, wherein the second server MAC address is obtained based on the determination that the next hop is the second server IP address.

13. The network device of claim 11, wherein generating the first VXLAN frame comprises determining the next hop MAC address in the IP fabric, wherein the next hop MAC address is not the second server.

14. The network device of claim 13, wherein the next hop MAC address is associated with a third network device in the IP fabric.

15. The network device of claim 11, wherein the network device is a switch.

* * * * *